UNITED STATES PATENT OFFICE.

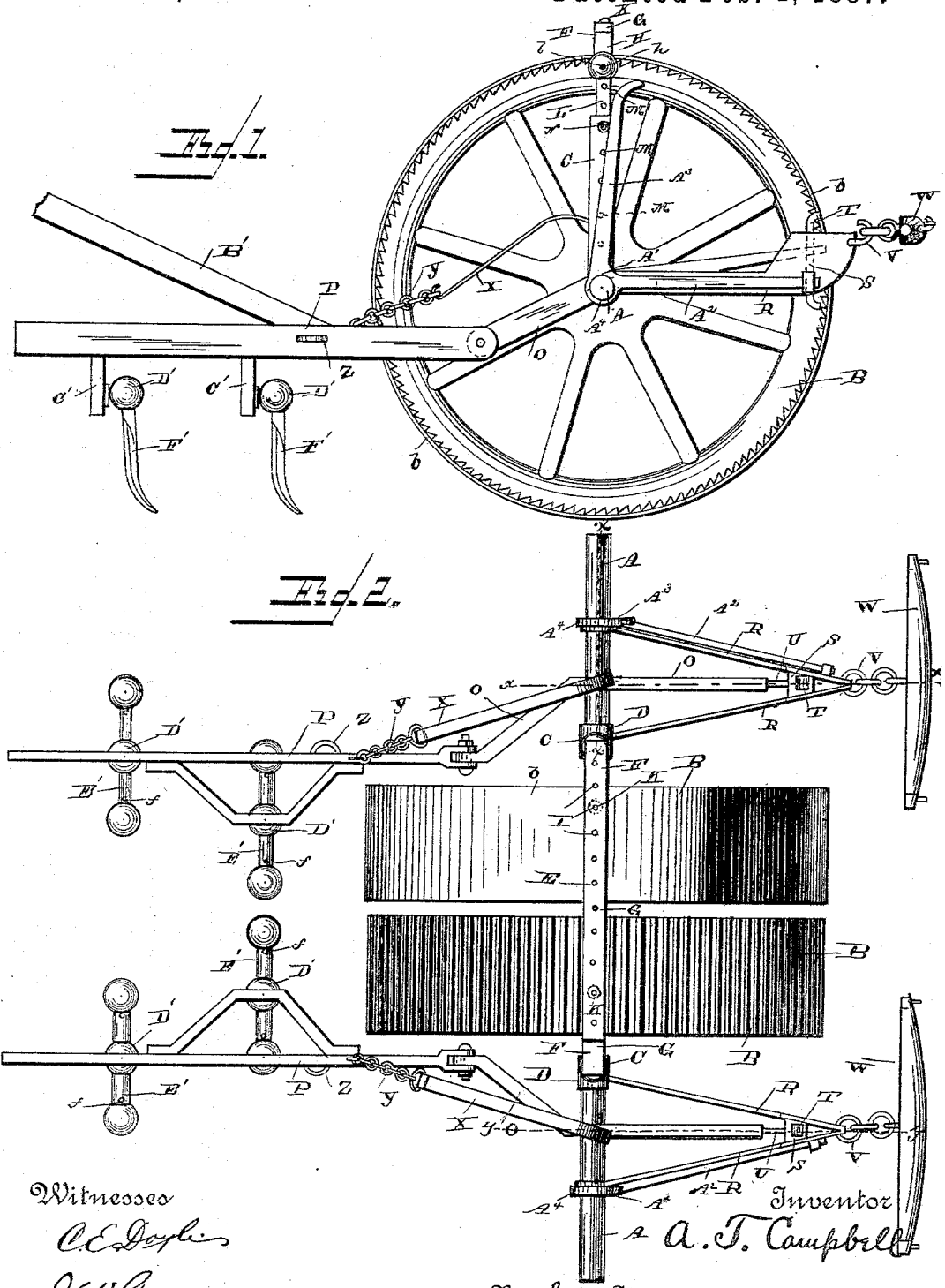

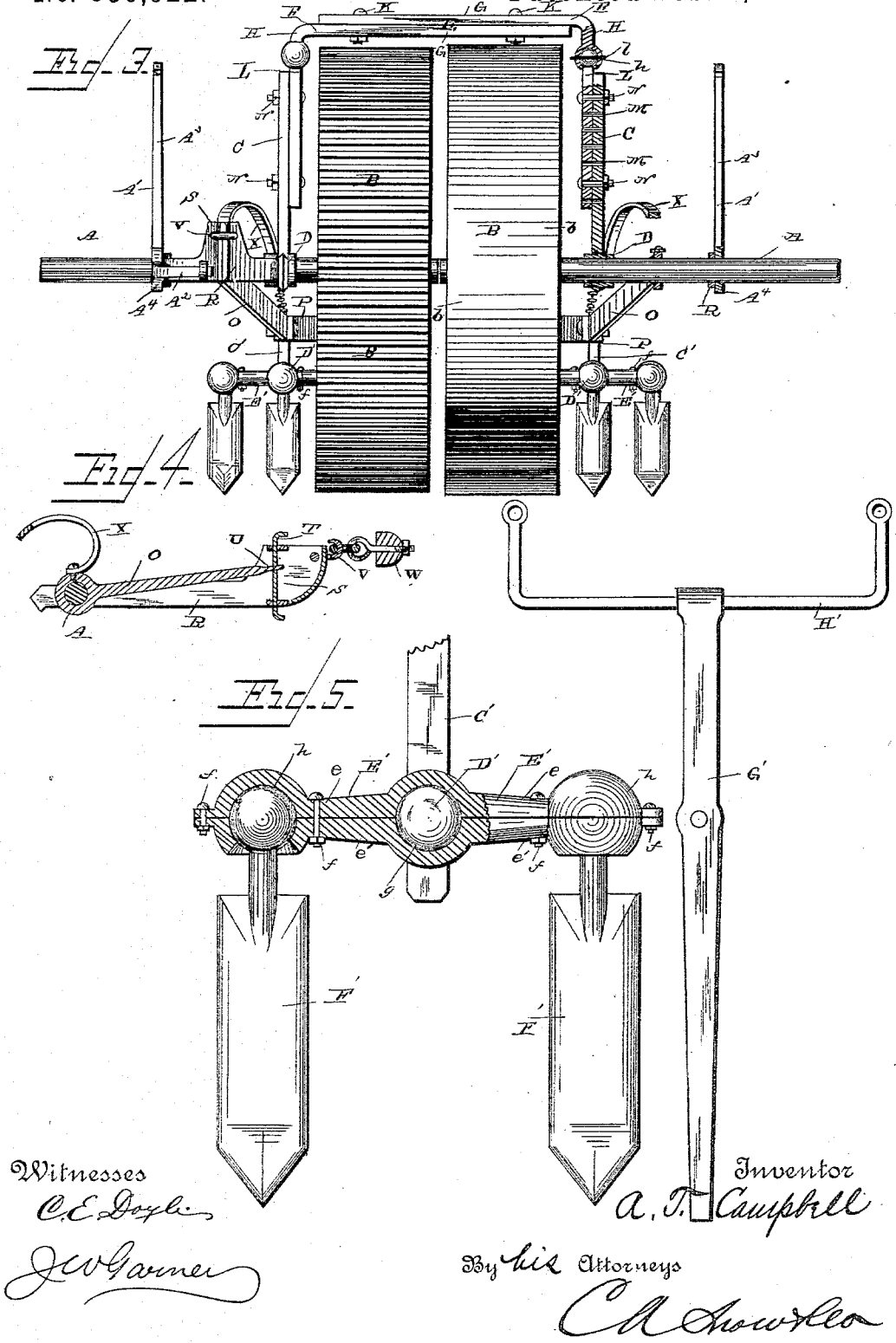

ANDREW THOMAS CAMPBELL, OF VEEDERSBURG, INDIANA.

WHEEL-CULTIVATOR.

SPECIFICATION forming part of Letters Patent No. 356,922, dated February 1, 1887.

Application filed November 10, 1886. Serial No. 218,483. (No model.)

*To all whom it may concern:*

Be it known that I, ANDREW THOMAS CAMPBELL, a citizen of the United States, residing at Veedersburg, in the county of Fountain and State of Indiana, have invented a new and useful Improvement in Tongue and Tongueless Wheel-Cultivators, of which the following is a specification.

My invention relates to an improvement in tongue and tongueless wheel-cultivators; and it consists in the peculiar construction and combination of devices that will be more fully set forth hereinafter, and particularly pointed out in the claims.

In the drawings, Figure 1 is a side elevation of a cultivator embodying my improvements. Fig. 2 is a top plan view of the same. Fig. 3 is a front elevation, partly in section on the line *x x* of Fig. 2. Fig. 4 is a longitudinal section taken on the line *y y* of Fig. 2. Fig. 5 is a detailed perspective view, partly in section, of one pair of the cultivating-shovels and their supporting-arm.

A represents a pair of shafts, each of which is provided at its inner end with a wheel, B, that is journaled to the shaft. The wheels B are of suitable diameter and of considerable width, and the rims of the wheels are serrated, and thereby provided with cutting-teeth adapted to crush clods. In order to adapt the wheels B to be used as rollers, I provide them with broad thin bands or tires B', which may be attached to the wheels or detached therefrom at will. To each shaft A, on the outer side of the wheels, is secured a vertical standard, C, by means of a collar, D, which is fitted on the shaft and to which the shaft is secured. E represents a U-shaped yoke, comprising two right-angled bars, F, having the long horizontal arm G and the shorter vertical arm H. The arms G are provided each with a series of vertical openings, I, and bolts K are adapted to pass through the said openings, so as to secure the arms together at any desired adjustment, thus rendering the yoke longitudinally adjustable. To the lower end of each vertical arm H is swiveled a vertical extended arm, L. The said arms L and the standards C are provided with vertical series of openings M, and bolts N pass through the said openings, so as to connect the arms L to the standards C and permit the yoke to be vertically adjusted toward or from the shafts A.

By having the standards swiveled to the depending arms of the yoke the shafts A are adapted to turn independently of each other, as will be readily understood.

O represents longitudinal draft-bars, which are secured to the shafts A near the outer ends thereof, and to the rear ends of the said draft-bars are pivoted or hinged cultivator-frames P. Brace-bars R have their rear ends attached to the shafts on opposite sides of the draft-bars, and the said brace-bars converge at their front ends and are connected together. Boxes S are formed at the front converging ends of the said brace-bars. Vertically-movable pins T pass through vertical openings, which are made in the upper and lower sides of the boxes S, and the front ends of the draft-bars are provided with projecting tongues U, which pass through openings that are made in the said pins. As the draft-bars are pivoted or hinged on the axles or shafts, and as the pins T are vertically movable in their guiding-boxes, it follows that a slight vertical play is given to the draft-bars. The front ends of the boxes S are provided with hooks or rings V, adapted for the attachment of single-trees W. The horses are attached singly to the said single-trees, and thereby each horse is attached directly to one of the cultivators.

X represents rearwardly-extending arms, which are attached to the draft-bars and have hooks at their rear ends. Chains Y are secured to the cultivator-frames and are attached to the hooks of the arms X. To the outer side of the beam of each cultivator-frame is attached a keeper, Z.

A' represents bars, which are bent at right angles, thereby forming the longitudinal arms $A^2$ and the vertical arms $A^3$, the upper ends of which are curved slightly forward. At the angles formed by the said arms are eyes $A^4$, which receive the projecting outer ends of the shafts or axles. The front ends of the horizontal arms $A^2$ are attached to the boxes S. Each cultivator-frame is provided with a handle-lever, B', and with a pair of depending standards, C', the said standards being arranged in an oblique line on the cultivator-frame and one in advance of the other. The lower end of each standard, on the front side thereof, is provided with a ball, D'.

E' represents transverse arms, which are made of two longitudinal separable sections, $e$ and $e'$, which are secured together by means of bolts $f$. In between the sections of each arm, at the center thereof, is formed a socket, $g$, adapted to receive one of the balls D', and thereby connect the arm to one of the standards. At the ends of the arms are formed ball-sockets $h$. The cultivating-shovels F' are provided at their upper ends with balls, which are secured in the sockets $h$. By loosening the bolts $f$ the arms E' may be adjusted to any desired position, and the shovels may be adjusted to any desired angle on the ends of the said arms. When the said bolts $f$ are tightened, the sections of the arms are rigidly clamped together, and the said arms are rigidly secured to the standards, and the shovels are rigidly secured to the arms. This construction enables the cultivators to be adapted for any kind of work, as the shovels may be caused to run at any desired angle in the ground or at any desired distance apart.

The yoke E, being longitudinally adjustable, enables the machine to be widened or narrowed, so as to cause the wheels B to run on opposite sides of the rows of plants, no matter at what distance the rows may be apart.

When it is desired to draw the machine across the field or along the road, the cultivator-frames are raised to a vertical position, and the hook-arms $A^3$ are caused to engage the keepers Z of the cultivator-frames, so as to sustain the latter. The single-trees W are not unhooked from the boxes S, and a tongue, G', having a transverse bar, H', at its rear end and provided with hooks, is attached to the horizontal arm G by a bolt through G and G' as a pivot, thus causing the machine to keep off of horses in going to and from work, and the draft-animals are attached thereto in the usual manner.

When the machine is intended to be used in preparing the ground before planting, the adjustable yoke E is shortened, so as to cause the wheels B to run closely side by side, as shown in the drawings. When the machine is to be used for cultivating growing crops planted in rows, this may be accomplished by lengthening the yoke E to the desired extent to separate the wheels B, so that the machine may be drawn along the row with one wheel on each side of the row of growing plants.

The operation of my invention will be very readily understood from the foregoing description and by reference to the accompanying drawings.

Having thus described my invention, I claim—

1. The combination, in a wheel-cultivator, of the yoke E, having the depending arms H, the standards C, swiveled to the said depending arms, the axles attached to the lower ends of the said standards and having the wheels on their inner ends, the draft-bars on the outer ends of the axles, and the cultivator-frames hinged or pivoted to the said draft-bars, substantially as described.

2. The combination, in a wheel-cultivator, of the laterally-adjustable yoke E, having the vertical depending arms H, the vertically-adjustable standards swiveled to the lower ends of the said arms, and thereby adapted to rotate independently of each other, the axles attached to the lower ends of the said standards, the wheels attached to the inner ends of the said axles, the draft-bars pivoted to the outer ends of the axles, and the trailing cultivators attached to the draft-bars, substantially as described.

3. In a wheel-cultivator, the combination of the axles attached to the yoke or frame and having the wheels on their inner ends, the draft-bars pivoted to the outer ends of the axle, the converging brace-arms on opposite sides of the draft-bars and extending forwardly, the boxes formed at the front ends of the said converging brace-arms, and in which the front ends of the draft-bars are secured and adapted to play vertically, and the trailing cultivators attached to the rear ends of the draft-bars, substantially as described.

4. In a wheel-cultivator having the independently-movable axles and the wheels attached to the inner ends of the axles, the draft-bars pivoted to the axles and having the rearward-extending hook arms X, the trailing cultivators attached to the rear ends of the draft-bars and having the chain Y, connected with the hook-arms X, the brace-arms R, attached to the axles and projecting forwardly therefrom, the boxes S at the front ends of the brace-bars, the pins T, attached to the front ends of the draft-bars and movable vertically in the boxes, and the hook-arms $A^3$, projecting upwardly from the axles, and to which the cultivators are attached when the latter are raised, for the purpose set forth, substantially as described.

5. The combination, in a cultivator, of the standard having the ball at its lower end, the arm E, having a socket to fit on the said ball, and the cultivating-shovels attached to the ends of the arms, substantially as described.

6. The combination of the cultivator having the standard, the arm E', attached to the standard by a ball-and-socket joint, the said arm being made in sections which are adapted to be clamped together, and having the ball-sockets at its outer ends, and the shovels having the balls at their upper ends to fit in the sockets in the ends of the arm, and means, substantially as described, to clamp the sections of the arm together, to secure the same to the standard, and also secure the shovels to the arm in any desired position, substantially as described.

In testimony that I claim the foregoing as my own I have hereto affixed my signature in presence of two witnesses.

ANDREW THOMAS CAMPBELL.

Witnesses:
 JOHN STEINBACH,
 STELLA MILLER.